United States Patent [19]
Noguchi

[11] 3,819,966
[45] June 25, 1974

[54] MOTOR WITH INTEGRAL CONSTANT TORQUE CLUTCH

[75] Inventor: Masaru Noguchi, Tokyo, Japan

[73] Assignee: Alps Motorola, Inc., Tokyo, Japan

[22] Filed: Mar. 21, 1973

[21] Appl. No.: 343,221

[52] U.S. Cl. ............... 310/74, 310/78, 310/162, 310/41
[51] Int. Cl. ............................................. H02k 7/108
[58] Field of Search ............... 310/41, 162–164, 310/75, 75 A, 75 D, 78, 66

[56] References Cited
UNITED STATES PATENTS

| | | | |
|---|---|---|---|
| 542,392 | 7/1895 | Manson | 310/78 X |
| 1,646,400 | 10/1927 | Getz | 310/78 |
| 1,690,267 | 11/1928 | Barrows et al. | 310/75 X |
| 1,756,689 | 4/1930 | Jenkins | 310/78 X |
| 1,956,417 | 4/1934 | Else | 310/78 |
| 3,082,336 | 3/1963 | Poole | 310/162 X |

*Primary Examiner*—D. F. Duggan
*Attorney, Agent, or Firm*—Mueller, Aichele & Ptak

[57] ABSTRACT

A synchronous motor is provided with a constant torque clutch coupled between the output shaft of the motor and the rotor; so that when a high inertia load is coupled to the output shaft, the clutch slips to limit the torque supplied by the motor to the output shaft to a predetermined maximum value.

9 Claims, 6 Drawing Figures

3,819,966

MOTOR WITH INTEGRAL CONSTANT TORQUE CLUTCH

BACKGROUND OF THE INVENTION

Cartridge player and record player mechanisms and the like have loads which have a high starting inertia. This has prevented the use of small synchronous motors for operating such players since synchronous motors have very little output torque upon initial energization, which makes self-starting of such a motor coupled to a high inertia load very difficult.

It is desirable to incorporate the low cost, frequency stability, and efficiency of a synchronous motor into a magnetic tape player without requiring a motor or prohibitive size to supply starting torque to the high inertia load coupled to it.

SUMMARY OF THE INVENTION

It is an object of this invention to provide an improved motor.

It is another object of this invention to provide a motor in which the rotor is coupled to the output shaft of the motor through a constant torque clutch.

It is an additional object of this invention to provide an improved synchronous motor capable of operating with a high inertia load coupled to its output shaft.

In accordance with a preferred embodiment to this invention, a motor is constructed with a constant torque slip clutch coupled between the rotor and the output shaft of the motor to limit the torque supplied by the motor to the output shaft irrespective of the demands of the load connected to the output shaft.

In a more specific embodiment of the invention, a flywheel is mounted on the output shaft within the motor housing, and the flywheel has a shape of an open-ended clyinder which overlies the stator of the motor to provide magnetic shielding.

DETAILED DESCRIPTION

Figure 1:
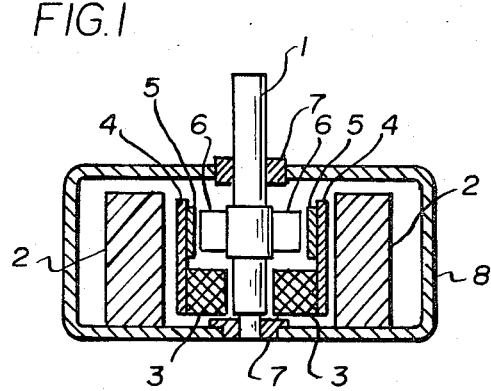
FIG. 1 is a cross-sectional view of a motor constructed in accordance with a preferred embodiment of this invention.

FIG. 1 is a cross-sectional view of a synchronous motor made in accordance with a preferred embodiment of this invention. The motor shown in FIG. 1 is a synchronous motor and preferably is of circular configuration so that all cross-sections are substantially the same. The motor comprises a frame or housing member 8 in which the remainder of the motor components are mounted. An output shaft 1 is supported by bearings 7 for free rotation in the housing 8 and the stator of the motor is attached to the housing concentrically about the shaft 1. A rotor 3 is attached to the inner surface of a clutch drum 4 which is mounted for rotation about the shaft 1 on a suitable bearing support (not shown). A clutch spring 5 (more clearly shown in FIGS. 2, 3 and 4) resiliently engages and is pressed upon the inner surface of the clutch drum 4, and a contact projection 9 on the spring engages a lever 6 which is fixed on the output shaft 1 when the clutch drum 4 is rotated. Thus, at a time when the rotor 3 and the clutch drum 4 are made to rotate by the magnetic field stator 2, the clutch spring 5 is pressed against the clutch drum 4 and revolves with the clutch drum and delivers the rotational output by engagement of the contact section 9 with the lever 6 to the output shaft.

When the load which is coupled to the output shaft has an inertia which is greater than an amount which would exceed the torque which can be delivered by the motor, the clutch spring 5 is arranged to slip relative to the clutch drum so that transmittal of torque to the output shaft 1 is limited. In other words, synchronous motor using the slip torque clutch device including the clutch drum 4 and the spring 5 is capable of limiting the torque delivered to the output shaft whenever the torque required to overcome the inertia of the load coupled to the shaft exceeds a certain rating.

Figure 2:
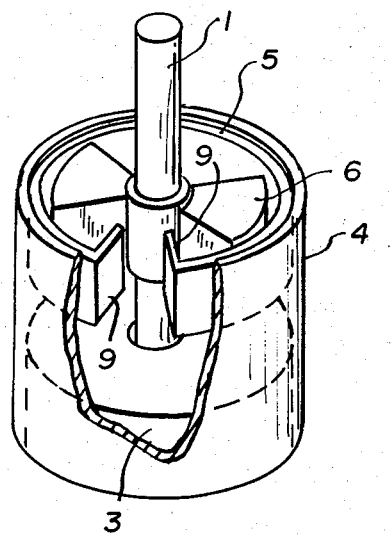
FIGS. 2, 3 and 4 show details of the motor of FIG. 1.
Figure 3:
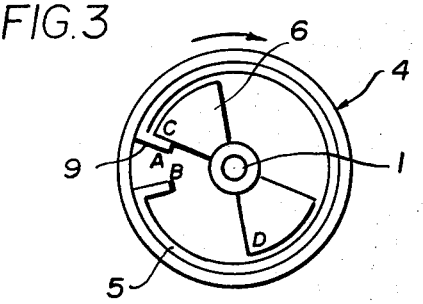
Figure 4:
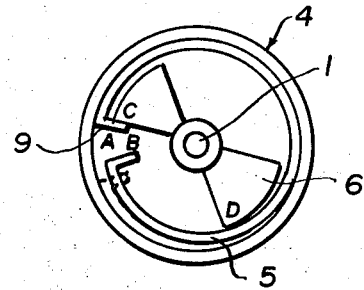

In FIGS. 2, 3 and 4, the details of the clutch device of the motor shown in FIG. 1 are illustrated and the same reference numerals are used in FIGS. 2, 3 and 4 as are used in FIG. 1 for the same parts. When the rotor 3 which is shown firmly fixed to the inner surface of the drum 4 (although it also could be fixed to the outer surface) is rotated by the magnetic field from the stator 2, the clutch spring 5 which is pressed upon the inner surface of the clutch drum 4 rotates with the clutch drum. Then one of the contact sections 9 formed by bending the ends of the clutch spring 5 inwardly catches a shoulder C on the lever 6 affixed to the output shaft 1 as shown in FIG. 3. This transmits the rotation of the clutch drum 4 to the output shaft 1. If the inertia of the load attached to the shaft 1 is such that it requires a torque greater than the above-mentioned certain amount, the side A of the clutch spring 5 starts to slip, and at the same time the side B is pushed inwardly toward the axis of the clutch drum and shaft 1, (most clearly shown in FIG. 4) by the friction produced between the clutch drum 4 and the clutch spring 5. The space formed between the inner surface of the clutch drum 4 and the clutch spring 5 reduces the friction between the spring 5 and the clutch drum 4 and thereby reduces the transmittal of the rotation of the clutch drum 4 to the output shaft 1.

In this way, by setting the pressure from the clutch spring 5 at the appropriate value, the torque, including the initial torque, transmitted to the output shaft 1 is limited to a maxium torque.

Figure 5:
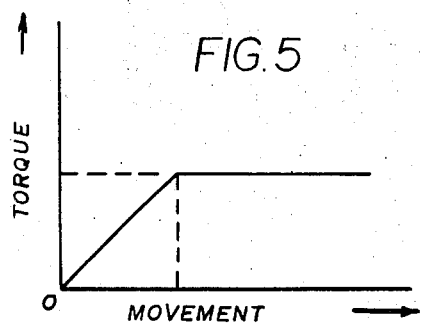
FIG. 5 is a graph of the output torque of the motor versus the movement of the output shaft.

FIG. 5 is a curve plotting the movement of the output shaft 1 with respect to the torque applied to it, and the maximum torque shown in FIG. 5 is the torque at which the spring 5 slips relative to the drum 4.

Figure 6:
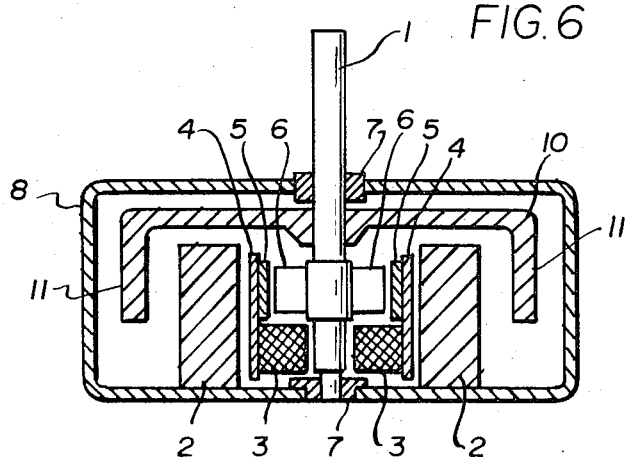
FIG. 6 is a cross-sectional view of another embodiment of the motor.

FIG. 6 is a cross-sectional view of another embodiment of this invention. The symbols used in FIG. 6 are the same as those used in FIG. 1 to show the identical parts. The motor shown in FIG. 6 is also a synchronous motor and preferably it is of circular configuration, so that all cross-sections are substantially the same.

In the motor shown in FIG. 6, a flywheel 10 is fixed onto the output shaft 1 within the housing 8 of the motor. In this way, the outer space usually required for a flywheel and which occupies most of the space in the conventional tape player may be omitted. In addition, when the flywheel 10 is made of pressed steel sheet material or the like, the manufacturing process is simplified. The flywheel 10 may be provided with its outer edge 11 extending downwardly (in FIG. 6) to form an open ended cylinder covering the stator. This produces the effect of shielding leakage of the magnetic field from the stator 2. The action of the clutch device for the motor shown in FIG. 6 is exactly the same as that illustrated in the embodiment of the motor shown in FIG. 1.

As described, the synchronous motors are appropriate for tape recorders and the like in which the motor is coupled to loads having high inertia. The motors provide a cost reduction for such tape players, making them smaller in size and improving the function.

I claim:

1. A motor for producing an output torque which is limited to a predetermined value, including in combination:

a housing for the motor;

a stator mounted within the housing;

a rotor located adjacent said stator and cooperating therewith to cause rotation of said rotor;

a clutch drum rotatably mounted in the housing and including a cylindrical surface concentrically arranged with said rotor;

a shaft rotationally mounted in the housing and axially aligned with the axis of said clutch drum;

said rotor being rigidly attached to one of said clutch drum and said shaft for rotating the same; and slip torque clutch means engaging said cylindrical surface of said clutch drum and coupled to said shaft for coupling a predetermined maximum torque between said clutch drum and said shaft.

2. The combination according to claim 1 wherein said motor is a synchronous motor.

3. The combination according to claim 1 wherein said rotor is attached to said clutch drum and said shaft is the output shaft for the motor.

4. The combination according to claim 3 further including a flywheel attached to said output shaft and located within said housing.

5. The combination according to claim 1 wherein said slip torque clutch means includes: an arcuate clutch spring pressed upon the inner surface of said clutch drum and extending about said inner surface over an arc greater than 180° and resiliently biased outwardly into engagement with the inner surface of said clutch drum, said spring having a projection on at least one end; and a lever attached to said shaft for engagement with said projection on said clutch spring, with said spring projection, and said lever coupling said clutch drum to said shaft for rotation together, said spring providing firm engagement with the inner surface of said clutch drum for loads coupled to the motor requiring less than said predetermined maximum torque and said spring slipping relative to said clutch drum for loads demanding torque in excess of said predetermined maximum torque to cause only said predetermined maximum torque to be coupled between said clutch drum and said shaft.

6. The combination according to claim 5 wherein both ends of said spring are bent inwardly to form first and second projections extending toward the axis of said clutch drum.

7. The combination according to claim 5 wherein said stator is concentrically arranged outside of said clutch drum.

8. The combination according to claim 7 wherein said rotor is attached to said clutch drum and said shaft is the output shaft for the motor, and further including a flywheel fixed to said output shaft within said housing.

9. The combination according to claim 8 wherein said flywheel has the shape of a cylinder open at one end and extends over said stator to minimize magnetic flux leakage from the motor.

* * * * *